(12) United States Patent
Dagnino et al.

(10) Patent No.: US 9,995,655 B2
(45) Date of Patent: Jun. 12, 2018

(54) ASSESSMENT OF POWER SYSTEM EQUIPMENT FOR EQUIPMENT MAINTENANCE AND/OR RISK MITIGATION

(71) Applicant: ABB Technology AG, Zurich (CH)

(72) Inventors: Aldo Dagnino, Cary, NC (US); Luiz Cheim, St. Charles, MO (US); Lan Lin, Raleigh, NC (US); Poorvi Patel, Ballwin, MO (US); Asim Fazlagic, Fuquay Varina, NC (US)

(73) Assignee: ABB Schweiz AG, Baden (CH)

( * ) Notice: Subject to any disclaimer, the term of this patent is extended or adjusted under 35 U.S.C. 154(b) by 719 days.

(21) Appl. No.: 14/083,616

(22) Filed: Nov. 19, 2013

(65) Prior Publication Data

US 2014/0156225 A1   Jun. 5, 2014

Related U.S. Application Data

(60) Provisional application No. 61/727,875, filed on Nov. 19, 2012.

(51) Int. Cl.
G01M 99/00 (2011.01)
G05B 23/02 (2006.01)

(52) U.S. Cl.
CPC ......... G01M 99/00 (2013.01); G05B 23/0283 (2013.01)

(58) Field of Classification Search
CPC ...................................................... G01M 99/00
(Continued)

(56) References Cited

U.S. PATENT DOCUMENTS 7,653,512 B2 * 1/2010 Cheung ............. G05B 23/0283
                                                   702/1
8,170,893 B1   5/2012 Rossi
(Continued)

FOREIGN PATENT DOCUMENTS

CN   101273314 A   9/2008
CN   102183555 A   9/2011

OTHER PUBLICATIONS

"Fault diagnosis of power transformer based on multi-layer SVM classifier", Ganyun LV, Haozhong Cheng, Haibao Zhai and Lixin Dong, Jul. 2005, Electric Power Systems Research, vol. 74, Issue 1, Abstract only, 2 pgs.

(Continued)

*Primary Examiner* — Ricky Ngon
(74) *Attorney, Agent, or Firm* — Barnes & Thornburg LLP

(57) ABSTRACT

Among other things, one or more techniques and/or systems are provided for assessing power system equipment of a power system. Historical sensor data and/or historical field test data collected from the power system equipment may be utilized to develop a health profile of the power system equipment. The health profile is indicative of a predicted health (e.g., or probability of failure) of the power system equipment. In one embodiment, the health profile further comprises a health index score which evaluates that health of the power system equipment in terms of the importance of the power system equipment to the power system. Using the health profiles developed for a plurality of power system equipment, a maintenance strategy for at least a portion of the power system may be developed.

20 Claims, 6 Drawing Sheets

(58) Field of Classification Search
USPC .......................................................... 702/183
See application file for complete search history.

(56) References Cited

U.S. PATENT DOCUMENTS

| | | | | |
|---|---|---|---|---|
| 8,437,904 | B2* | 5/2013 | Mansouri | G07C 5/0808 244/152 |
| 8,762,106 | B2* | 6/2014 | Miller | G05B 17/02 702/179 |
| 8,768,657 | B2* | 7/2014 | Goldfine | G01N 27/82 702/183 |
| 2003/0229664 | A1 | 12/2003 | Hollaway | |
| 2006/0241907 | A1 | 10/2006 | Armstrong et al. | |
| 2007/0093925 | A1 | 4/2007 | Moughler | |
| 2008/0109185 | A1 | 5/2008 | Cheung et al. | |
| 2011/0054806 | A1 | 3/2011 | Goldfine et al. | |
| 2011/0213744 | A1* | 9/2011 | Sparling | H02H 7/04 706/46 |
| 2012/0197852 | A1* | 8/2012 | Dutta | H04L 67/2804 707/692 |
| 2012/0259585 | A1* | 10/2012 | Haynes | G06Q 50/30 702/182 |

OTHER PUBLICATIONS

"Condition Data Aggregation with Application to Failure Rate Calculation of Power Transformers", Jyotishman Pathak, Yong Jiang, Vasant Honavar and James McCalley, 2006, Proceedings of the 39th Hawaii International Conference on System Sciences, cited from the Internet at: http://www.computer.org/csdl/proceedings/hicss/2006/2507/10/250710024la.pdf, 10 pgs.
"Optimal Parameters of Rectifier Power Transformer by Intelligent Techniques", K.S. Rama Rao, K.N. MD Hasan and M.N.Karsiti, 2009, The Online Journal on Electronics and Electrical Engineering vol. 1, No. 1, cited on the Internet at: http://www.computer.org/csdl/proceedings/hicss/2006/2507/10/250710024la.pdf, pp. 15-19.
"Association Rule Mining-Based Dissolved Gas Analysis for Fault Diagnosis of Power Transformers", Z. Yang W.H. Tang, A. Shintemirov and Q.H.Wu, Jul. 14, 2009, IEEE Transactions on Systems, Man and Cybernetics, Part C Application and Reviews, Abstract only, 2 pgs.
"Rough Set Theory for Data Mining for Fault Diagnosis on Power Transformer", Zhao Wenqing Zhao and Tongli Zhu, 2006, IEEE TENCON 2006 Region 10 Conference, Abstract only, 2 pgs.
"On-line Transformer Condition Monitoring through Diagnostics and Anomaly Detection" V.M.Catterson, S.E. Rudd, S.D.J. McArthur and G. Moss, Nov. 2009, In 15th International Conference on Intelligent Systems Application to Power Systems, Abstract only, 2 pgs.
"Data Mining Techniques to Assess the Condition of High Voltage Electrical Plant", A.J. McGrail, E. Gulski, E.R.S. Groot, D. Allan, D. Birtwhistle and T.R. Blackburn, 2002, in Set of Papers Presented to the CIGRE 2002 Session No. 39, Aug. 25-30, 2002, Paris, France. 12 pgs.
"Advances in Data Mining for Dissolved Gas Analysis", D.G. Esp, A.J. McGrail, Apr. 2000, Conference Record of the 2000 IEEE International Symposium on Electrical Insulation, Abstract only, 2 pgs.

"Data Mining for Distribution System Fault Classification", H.M. Dola and B.H. Chowdhury, 2005, In Proceedings of 37th Annual North American Power Symposium, Abstract only, 2 pgs.
"A Transformer Condition Assessment Framework Based on Data Mining", Yongli Zhu, Lizeng Wu, Xueyu Li and Jinsha Yuan, 2005, IEEE Power Engineering Society General Meeting, Abstract only, 2 pgs.
"Biologically Inspired Inteligent Fault Diagnosis for Power Distribution Systems", Le Xu, 2006, Ph.D.Dissertation, North Carolina State University, Abstract only, 2 pgs.
"Artificial Intelligence Applications in the Diagnosis of Power Transformer Incipient Faults", Zhenyuan Wang, 2000, Ph.D. Dissertation, Virginia Tech, 10 pgs.
International Search Report dated Feb. 17, 2014.
S. Khan Et al. "A Predictive Maintenance Approach for Power Distribution Systems" Proceeding of the 27th Annual North American Power Symposium, Bozeman, MT, Oct. 3, 1995, pp. 700-707, XP055101042, Retrieved from the internet: URL:http://psalserver.tamu.edu/main/papers/211%20khan%20Butler%20Russell.pdf, retrieved on Feb. 10, 2014.
"IAEA-TECDOC-1551 Implementation Strategies and Tools for Condition Based Maintenance at Nuclear Power Plants" May 1, 2007 , XP055100361,Retrieved from the Internet:URL:http://www-pub.iaea.org/MTCDjpublications/PDF/te 1551 web.pdf retrieved on Feb. 5, 2014sections 3.4, 5, 7.2, 7.5, Annexes I and V.
Handschin E et al: "Novel Methods for the Condition Based Maintenance of Distribution Networks", Power Tech, 2007 IEEE Lausanne, IEEE, Piscataway, NJ, USA,Jul. 1, 2007, pp. 6-11, XP031269344, ISBN: 978-1-4244-2189-3.
Carl S Byington et al: "Data Fusion for Developing Predictive Diagnostics for Electromechanical Systems", Jan. 1, 2001, XP055101037, Retrieved from the Internet: URL:http://dsp-book.narod.ru/HMDF/2379ch23.pdf retrieved on Feb. 10, 2014 sections 23.1, 23.2, 23.3.2.2, 23.5.1.1.1, 23.5.1.1.6 and 23.5.1.1.7.
Dong et al: "Hidden semi-Markov model-based methodology for multi-sensor equipment health diagnosis and prognosis", European Journal of Operational Research, Amsterdam, NL, vol. 178, No. 3, Nov. 21, 2006, pp. 858-878, XP005774467, ISSN: 0377-2217, DOI:10.14016/J.EJOR.2006.01.041 section 7.
R. Shoureshi et al: "Sensor fusion and complex data analysis for predictive maintenance". 36th Annual Hawaii International Conference on System Sciences, 2003. Proceedings of the, Jan. 1, 2003, p. 7 pp., XP055101140, DOI: 10.1109/HICSS.2003.1173904 ISBN:978-0-76-951874-9 section 5.
Non-Final Office Action cited in U.S. Appl. No. 14/886,597 dated Jun. 29, 2016, 17 pgs.
Reply Non-Final Office Action cited in U.S. Appl. No. 14/886,597 dated Sep. 28, 2016, 15 pgs.
Final Office Action cited in U.S. Appl. No. 14/886,597 dated Jan. 18, 2017, 14 pgs.
Reply Final Office Action cited in U.S. Appl. No. 14/886,597 dated Apr. 18, 2017, 11 pgs.
First Chinese Office Action cited in Chinese Application No. 201380070756.7 dated Dec. 27, 2016, 13 pgs.
EP Communication cited in EP Application No. 13802782.6 dated Oct. 11, 2016, 10 pgs.

* cited by examiner

| TRANSFORMER | SIGNIFICANCE SCORE | HEALTH SCORE | HEALTH INDEX SCORE |
|---|---|---|---|
| Transformer 12436 | 5.0 | 3.2 | 8.2 |
| Transformer 16571 | 7.0 | 1.4 | 8.4 |
| Transformer 18790 | 7.0 | 3.3 | 9.2 |
| Transformer 12435 | 1.0 | 9.2 | 10.2 |
| Transformer 16873 | 10.0 | 2.8 | 12.8 |

FIG. 2

ASSESSMENT OF POWER SYSTEM EQUIPMENT FOR EQUIPMENT MAINTENANCE AND/OR RISK MITIGATION

RELATED APPLICATION

This application is a Non-Provisional of U.S. Provisional Patent Application No. 61/727,875, filed on Nov. 19, 2012 and entitled "ASSESSMENT OF POWER SYSTEM EQUIPMENT FOR EQUIPMENT MAINTENANCE AND/OR RISK MITIGATION," which is incorporated herein.

BACKGROUND

The present application relates to the field of power systems and more particularly to systems and/or techniques for determining a condition, or health, of various electrical components within the power system to provide maintenance recommendations and/or to mitigate risk of failure.

A power system comprises a network of electrical components or power system equipment configured to supply, transmit, and/or use electrical power. For example, a power grid (e.g., also referred to as an electrical distribution grid) comprises generators, transmission systems, and/or distribution systems. Generators, or power stations, are configured to produce electricity from combustible fuels (e.g., coal, natural gas, etc.) and/or non-combustible fuels (e.g., such as wind, solar, nuclear, etc.). Transmission systems are configured to carry or transmit the electricity from the generators to loads. Distribution systems are configured to feed the supplied electricity to nearby homes, commercial businesses, and/or other establishments. Some electrical components or equipment of a power system include transformers and circuit breakers, for example. Transmission systems and/or distribution systems, for example, generally comprise one or more transformers configured to convert or transform electricity at one voltage (e.g. a voltage used to transmit electricity) to electricity at another voltage (e.g., a voltage desired by a load receiving the electricity). Circuit breakers may be utilized to mitigate damage to other electrical components by limiting current flow to such other components, for example. Depending upon, among other things, the application, the amount of power and/or voltage handled by the electrical components, some of these electrical components may be relatively expensive (e.g., cost a million dollars or more).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to one aspect, a method for assessing power system equipment to predict a health of the power system equipment is provided. The method comprises acquiring historical sensor data yielded from one or more sensors operably coupled to the power system equipment. The historical sensor data is indicative of one or more sensor measurements taken over a first time interval. The method also comprises acquiring historical field test data yielded from one or more field tests performed on the power system equipment. The historical field test data is indicative of one or more field test measurements taken over a second time interval. The method further comprises using the historical sensor data and the historical field test data to generate a health profile of the power system equipment, the health profile indicative of a predicted health of the power system equipment.

According to another aspect, a system for predicting a health of power system equipment is provided. The system comprises a historian data repository configured to receive, over time, sensor data yielded from one or more sensors operably coupled to the power system equipment to create historical sensor data and configured to receive, over time, field test data yielded from one or more field tests performed on the power system equipment to create historical field test data. The system also comprises a machine learning component configured to generate a health profile of the power system equipment using the historical sensor data and the historical field test data. The health profile is indicative of a predicted health of the power system equipment.

According to yet another aspect, a computer readable medium comprising processor executable instructions that when executed perform a method for assessing power system equipment to predict a health of the power system equipment is provided. The method comprises acquiring historical sensor data yielded from one or more sensors operably coupled to the power system equipment. The historical sensor data is indicative of one or more sensor measurements taken over a first time interval. The method also comprises acquiring historical field test data yielded from one or more field tests performed on the power system equipment. The historical field test data is indicative of one or more field test measurements taken over a second time interval. The method further comprises using the historical sensor data and the historical field test data to generate a health profile of the power system equipment, the health profile indicative of a predicted health of the power system equipment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 2 illustrates an example chart to describe how a maintenance strategy may be developed for a fleet of power system equipment.

DETAILED DESCRIPTION

Figure 1:
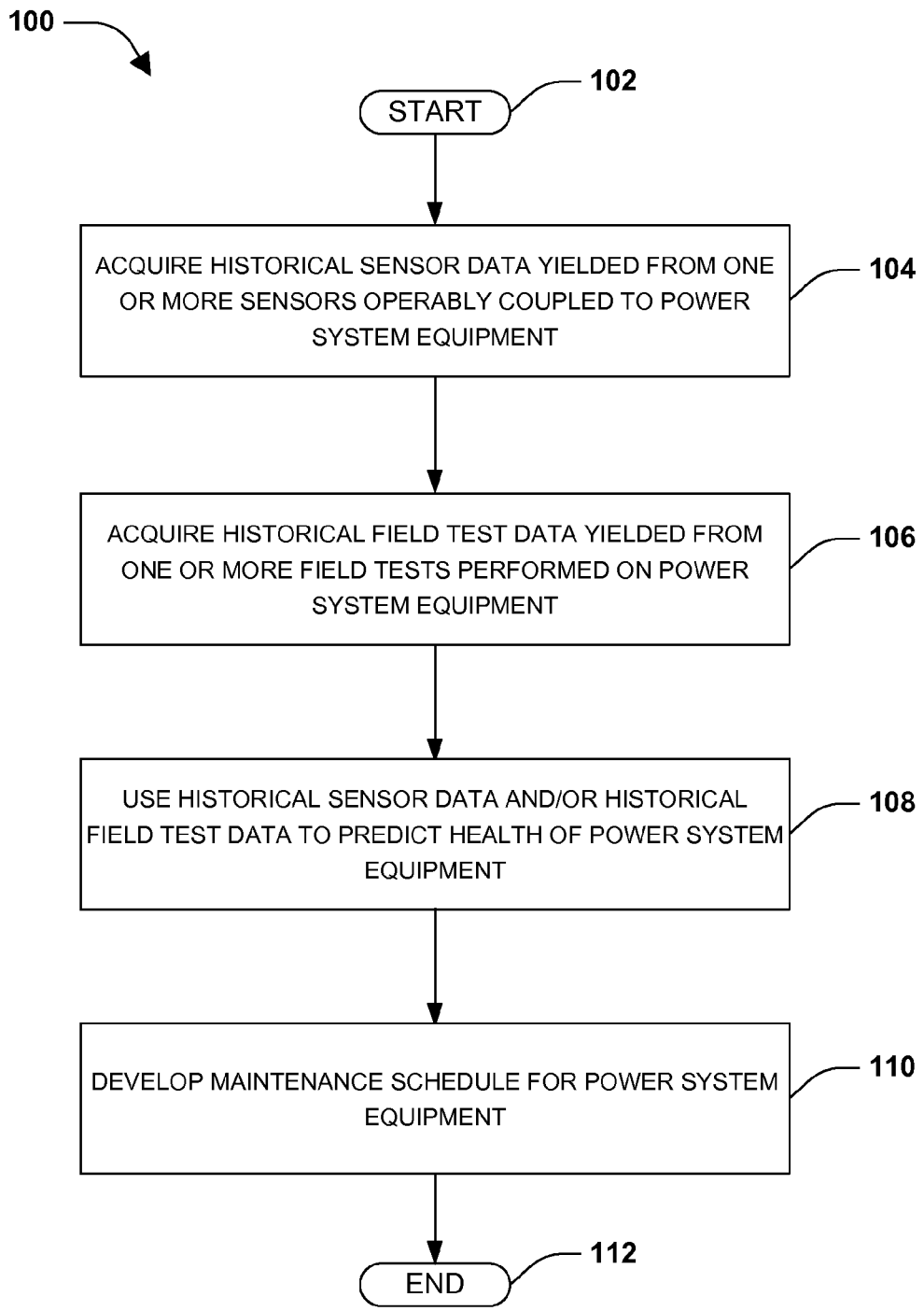
FIG. 1 is a flow diagram illustrating an exemplary method of generating a health profile to assess power system equipment.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A power grid may be comprised of thousands if not millions of electrical components (e.g., also referred to herein as power system equipment). The failure of at least some of these electrical components may reduce the performance of the power system. Moreover, due to, among other things, the cost and/or size of some electrical components, there may be little to no redundancy at some junctions in the power system. A failure at one of more of these junctions may result in the loss of electricity to some consumers. As such, the detection of power system equipment on the verge of failure and/or the detection of power system equipment in need of maintenance may be an important component of maintaining the overall performance of the power system.

Accordingly, sensors may be placed within equipment of a power system to capture information about the performance of the particular asset or power system equipment. For example, some high voltage transformers comprise sensors configured to measure an oil temperature of the transformer, to gauge an amount of water in the oil, to measure dissolved gases in the oil, and/or to measure a temperature of the core. Data yielded from such sensors may be referred to herein as sensor data and is typically transmitted (e.g., via a fiber optics network or other communication medium) to a central repository, where it is analyzed to provide a snap-shot of the present-day health of the power system.

Moreover, as part of regular maintenance, field test may be performed on the power system equipment. For example, transformers may be de-energized to perform tests that cannot be performed via sensors and/or to perform tests that can provide a more detailed understanding of the power system equipment (e.g., relative to the sensor measurements). For example, a sensor may measure up to six types of dissolved gases in the oil of a transformer whereas a field test may measure thirteen or more types of dissolved gases. As such, the field test data derived from the field test may provide a more detailed snap-shot of the present-day health of the power system than the sensor data derived from the sensors.

While such sensor data and field test data may be used to provide a snap-shot of the present-day health or performance of the power system, little to no information regarding the predicted health of the power system (e.g., or probability of failure) over a future timespan (e.g., which may range from several days to years) has been derived from such data. Therefore, mid-term and long-term maintenance schedules for a unit of power system equipment have been developed based primarily upon maintenance expectations for that particular model of power system equipment and/or that particular class of power system equipment, as opposed to knowledge pertaining to the unit of power system equipment.

Accordingly, one or more systems and/or techniques for generating a health profile of power system equipment based upon data yielded from the power system equipment are provided. The health profile is indicative of an expected/predicted health of the power system equipment and may be utilized to develop a maintenance schedule for the power system equipment. By respectively developing health profiles for a plurality of power system equipment, such as a fleet of power system equipment, a maintenance strategy may be devised for the fleet. In this way, a maintenance strategy can be developed that facilitates allocating a limited number of resources (e.g., maintenance technicians, replacement units, etc.) in a manner that improves performance of the power system (e.g., by allocating resources based upon knowledge of the equipment, which may provide a more accurate forecast than information developed for a model or class of equipment).

In one embodiment, the health profile of power system equipment may be described in terms of expected maintenance and/or in terms a probability of failure over the specified time span. That is, stated differently, the future health of the power system equipment may relate to the length of time the power system equipment is expected to last without requiring maintenance and/or without failing. Power system equipment that is expected to fail and/or expected to require maintenance within the next 6 months may be less healthy than power system equipment not expected to require maintenance and/or fail within at least a year, for example.

One embodiment for assessing power system equipment to generate a health profile of the power system equipment is illustrated by example method 100 in FIG. 1. The example method 100 starts at 102, and historical sensor data yielded from one or more sensors comprised within and/or operably coupled to the power system equipment is acquired at 104. The historical sensor data is data that has accumulated from the sensors over a specified time interval and is indicative of sensor measurements (or results of sensor measurements) taken over the specified time interval. For example, in one embodiment, the historical sensor data is indicative of sensor measurements taken over a first time interval, which may be a few days, 6 months, a year, the life of the sensor(s) taking the measurements, the life of the power system equipment, etc.

Acquiring the historical sensor data may comprise, among other things, retrieving the historical sensor data from a central repository (e.g., a historian data repository) and/or transferring the historical sensor data from a storage medium to a medium where computations can be performed on the sensor data. For example, the historical sensor data may be copied from a central repository (e.g., such as a magnetic data storage device) to random-access memory on a computing device configured to perform computations on the sensor data. In another embodiment, acquiring the historical sensor data may comprise being granted access to the historical sensor data. For example, authentication credentials or other identity verification tools (e.g., IP address verification, MAC address verification, etc.) may be utilized to verify that an entity attempting to access the historical sensor data has permission to access the data. After the identity is verified, the entity may gain access to the historical sensor data and thus acquire the historical sensor data.

The type(s) of sensor data collected may be a function of, among other things, a type of power system equipment for which the health profile is being generated and/or measurement functions of sensors operably coupled to the power system equipment. By way of example, in one embodiment, the power system equipment is, or comprises, a power transformer. In such an embodiment, the sensors may be configured to measure, among other things, oil temperature, an amount/percentage of water in the oil, a temperature of the core, concentrations of one or more dissolved gases in the oil, and/or an ambient air temperature surrounding the power transformer. As such, the sensory data may relate to the oil temperature, water-to-oil ratio, core temperature, dissolved gas concentrations, and/or ambient air temperature, for example. Where the power system equipment is instead a circuit breaker, capacitor, voltage regulator, or other component of a power system, the sensor data that is collected may be indicative of other or different information, for example.

At 106 in the example method 100, historical field test data from one or more field tests performed on the power system equipment is acquired. The historical field test data is data that has been accumulated from field test(s) on the power system equipment over a specified time interval and is indicative of field test measurements (or results of the field test measurements) taken over the specified time interval. For example, in one embodiment, the historical field test data is indicative of field test measurements taken over a second time interval. The second time interval may correspond to (e.g., match) the first time interval over which sensor measurements are taken, may have some overlap with the first time interval, or may be non-overlapping with the first time interval.

It may be appreciated that as used herein, field tests are intended to refer to tests performed on-site at the power system equipment (e.g., typically while the power system is de-energized) and/or tests performed from samples collected from the power system equipment. Generally, such tests require human interaction with the power system equipment (e.g., to collect the samples), although the samples may be collected and/or the tests may be performed with little to no human interaction (e.g., via robotics or other automation techniques). Conversely, sensor measurements are typically acquired from sensors comprised within and/or operably coupled to the power system equipment. As such, sensor measurements are typically acquired with little to no human interaction. Moreover, where human interaction is desired, such interaction may occur remotely relative to the power system equipment. For example, a human operator may transmit a signal instructing one or more sensors operably coupled to the power system equipment to capture a measurement.

Historical field test data may be acquired in a manner similar to the historical sensor data or may be acquired in a different manner. For example, in one embodiment, the historical field test data may be copied from a central repository (e.g., such as a magnetic data storage device) to random-access memory on a computing device configured to perform computations on the historical field test data. In another embodiment, acquiring the historical field test data may comprise being granted access the historical field test data. For example, authentication credentials or other identity verification tools may be utilized to verify that an entity attempting to access the historical field test data has permission to access the data.

The type of field test data collected may be a function of, among other things, a type of power system equipment for which the health profile is being generated. By way of example, during field testing of a power transformer, a technician may visit the site of the power transformer and capture a sample of the oil in the transformer. Numerous tests may be performed on this oil sample to yield field test data corresponding to the power transformer. As an example, dissolved gas analysis may be performed on the oil to measure carbon monoxide, carbon dioxide, acetylene, ethylene, methane, ethane, or other gas concentrations in the oil and field test data may be generated indicative of the results of the analysis. In other embodiments, the power system equipment may comprise, among other things, a circuit breaker, a capacitor, and/or a voltage regulator, for example, and the field test that are performed may be different than the field test performed for a power transformer, for example.

At 108 in the example method 100, the historical sensor data and/or the historical field test are used to generate a health profile of the power system equipment. The health profile is indicative of the predicted health of the power system equipment (e.g., over a future interval of time). Such a prediction may be useful to estimate a maintenance timeline for the power system equipment and/or to estimate a replacement date for the power system equipment based upon trends and/or patterns in the historical sensor data and/or the historical field test data for the power system equipment. Moreover, in another embodiment, such a prediction may be useful to estimate a probability of (a need for) maintenance over a specified time period and/or to estimate a probability of failure over the specified time period.

In one embodiment, the health of the power system equipment can be predicted via analytic and/or interactive techniques that use, as inputs, the historical sensor data and/or historical field test data. As an example, an algorithm, such as a machine learning and/or data analysis algorithm, may be developed based upon the historical sensor data and/or historical field test data. Such an algorithm may be configured to analyze the historical sensor data and/or historical field test data using clustering analysis, classification analysis, association analysis, pattern discovery, regression, anomaly detection analysis, and/or other predictive modeling techniques that identify trends and/or patterns in the historical sensor data and/or historical field test data. Information regarding the performance or health of the power system equipment over some period in the future may be extrapolated from this analysis, for example.

By way of example, in a power transformer elevated levels of carbon monoxide and/or carbon dioxide in the oil may indicate that the power transformer is overloaded and/or elevated levels of hydrogen in the oil may indicate the development of corona in the power transformer. Therefore, by analyzing historical field test data and/or historical sensor data yielded from the transformer over period of time, it may be estimated how long the power transformer may operate (e.g., given loading conditions of the power transformer during the period in which the historical sensor data and/or historical field test data were generated) before failing and/or requiring maintenance.

In one embodiment, the significance or importance of the power system equipment to the power system may be considered when developing the health profile. For example, redundant power system equipment may be less significant to the power system than power system equipment with little to no redundancy because a failure of the power system equipment with little to no redundancy may result in the loss of electricity to consumers. Further, power system equipment that supplies electricity to a large number of consumers may be more significant than power system equipment that supplies electricity to merely a handful of consumers.

Accordingly, in one embodiment, the health profile comprises a health index score for the power system equipment. The health index score may be derived based at least in part upon the importance or significance of the power system equipment in the power system and/or a risk of failure of the power system equipment. That is, stated differently, the health index score describes a balance between the importance of the power system equipment and the risk of failure by the power system equipment. The importance or significance of the health power system equipment may be assessed via software programs that are configured to trace the power system (e.g., grid) to identify vulnerable areas of the power system (e.g., lacking sufficient redundancy) and/or may be manually input, for example.

Such a health index score may be useful in evaluating the urgency of maintenance and/or replacement. By way of example, a first unit of power system equipment that is important to the power system may be assigned a lower health index score than a second unit of power system equipment that is less important to the power system even if the second unit is more likely to fail than the first unit because the value of maintaining the performance of the first unit outweighs the risk of failure of the second unit (e.g., where maintenance priority is given to power system equipment with a lower health index score).

At 110 in the example method 100, a maintenance schedule for the power system equipment is developed. The maintenance schedule may forecast a timeline for expected maintenance to the power system and/or may provide an indication of when the power system is expected to fail given operational characteristics of the power system equipment during the interval represented by the historical sensor data and/or historical field data. In this way, maintenance technicians and/or a maintenance scheduler can determine whether maintenance and/or replacement of the power transformer is urgent and/or determine how much longer the power transformer can be in operation before requiring maintenance and/or replacement, for example.

The example method 100 ends at 112.

It may be appreciated that while the method 100 describes generating a health profile using historical sensor data and/or historical field test data, new sensor data (e.g., more current/fresh sensor data relative to the historical sensor data) and/or new field test data (e.g., more current/fresh sensor data relative to the historical field test data) may also be considered in evaluating the health of the power system equipment. By way of example, the health profile generated at 108 may provide a baseline or historical history of the performance of the power system equipment. That is, stated differently, the health profile may indicate trends in characteristics/properties of the power system equipment. As new field test data and/or new sensor data is received, the new field test data and/or the new sensor data may be utilized to update the trends (e.g., updating the health index score, updating a developed maintenance schedule, etc.). Further, if the new sensor data and/or the new field test data is indicative of measurement results that deviate from the health profile by more than a specified threshold or are outside a normal deviation range (e.g., where the range describes what changes to characteristics/properties are expected/tolerable under the normal operation of the power system equipment), a maintenance request may be issued requesting maintenance to the power system equipment. That is, stated differently, when the data indicates that the power system equipment is operating abnormally (e.g., relative to trends in the operation of the power system equipment), a maintenance request may be issued to determine why the data is indicative of abnormal results, for example.

It may be appreciated that the foregoing acts of the example method 100 may be repeated for a plurality of power system equipment in the power system. Further, in one embodiment, using the health profiles of a plurality of power system equipment (e.g., assets), a maintenance strategy for the power system or for the plurality of power system equipment may be developed. The maintenance strategy may provide a structure or order for scheduling maintenance and/or may provide a tool to facilitate allocating limited resources across the power system, for example.

FIG. 2 illustrates an example chart 200 providing an example maintenance strategy. In the example maintenance strategy, a plurality of power system equipment is ranked or ordered according to their respective health index scores 206 determined at 108 in the example method 100 (e.g., as part of generating the health profile). That is, stated differently, first power system equipment (e.g., a first transformer) may be ranked/ordered relative to second power system equipment (e.g., a second transformer) at least in part according to a first health index score of the power first power system equipment and a second health index score of the second power system equipment. In the illustrated embodiment, maintenance priority may be given to power system equipment having a low health index score over power system equipment having a higher health index score. Thus, according to the chart 200, priority may be given to transformer 12436 over the other listed transformers because the health index score of transformer 12436 is the lowest.

As previously described with respect to the example method 100, the health index score may be derived based at least in part upon an importance of the power system equipment in the power system and a risk of failure of the power system equipment. For example, in the illustrated graph 200, respective transformers are assigned a significance score 202 indicative of their significance to the power system. The lower the significance score 202, the more significant the transformer is to the power system. Further, respective transformers may be assigned a health score 204 based upon the historical sensor data and/or the historical field test data. The health score 204 may describe a likelihood of failure and/or an estimated health of the transformer. A low score may indicate that a transformer is unhealthy (e.g., and thus at a greater risk of failure). In the illustrated embodiment, the health index score is the sum of the significance score and the health score. For example, transformer 12436 has a health index score of 8.2 (e.g., 5.0+3.2). In another embodiment, the significance score may be weighted to be a more significant component of the health index score than the health score and/or vice-versa.

Further, it may be appreciated that by taking into consideration the significance of the transformer, the least healthy transformer may not be assigned a highest priority level. For example, transformer 16571 has the lowest health score (e.g., and is thus at the greatest risk of failure) out of the listed transformers. However, transformer 12436 is ordered higher on the chart 200 (e.g., and thus as a higher maintenance priority) than transformer 16571 because transformer 12436 is more significant than transformer 16571, for example.

Figure 3:
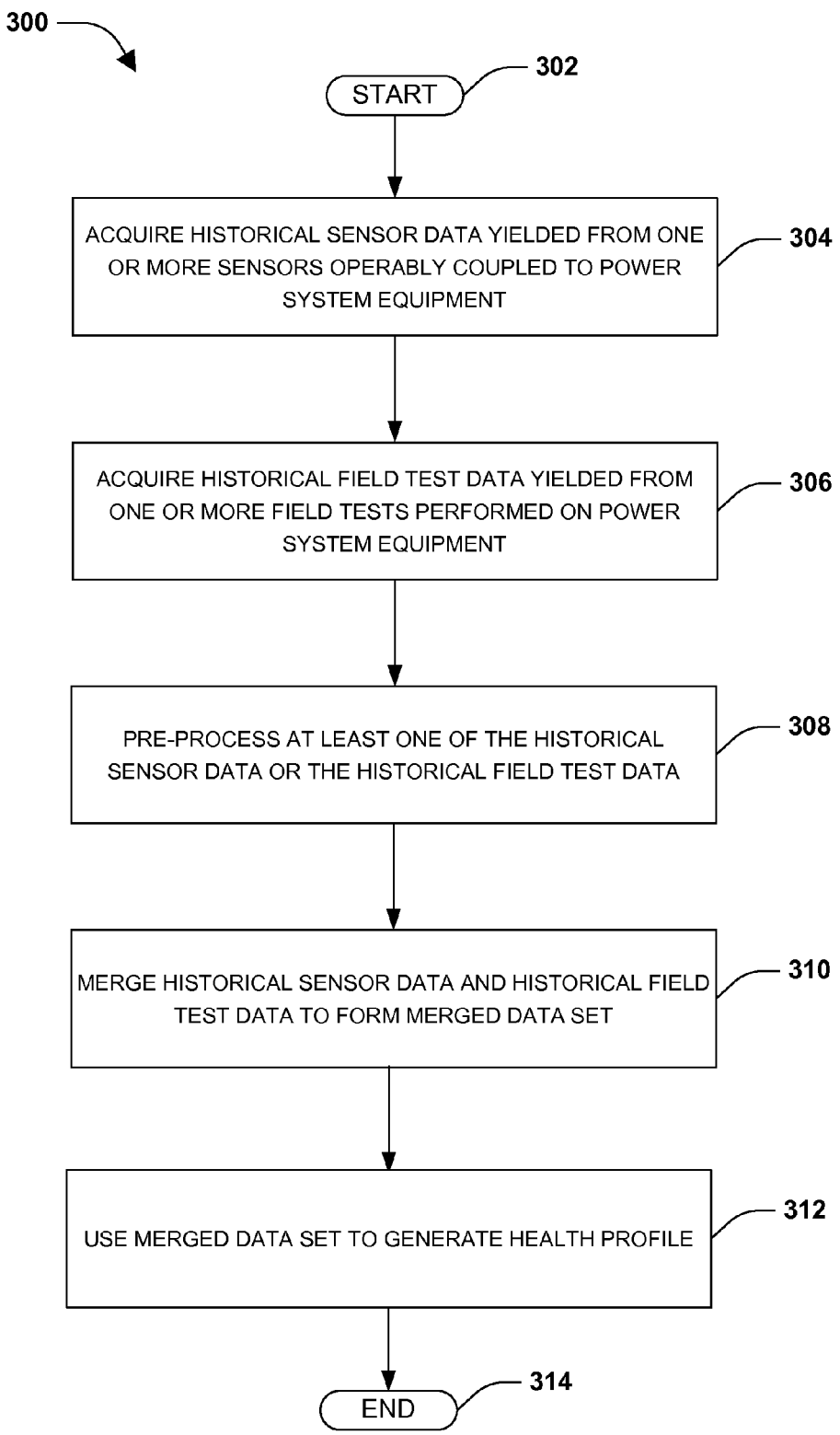
FIG. 3 is a flow diagram illustrating an exemplary method of generating a health profile to assess power system equipment.

FIG. 3 illustrates another example method 300 for assessing power system equipment to predict a health of the power system equipment. It may be appreciated that the foregoing features of example method 100 of FIG. 1 may also find applicability in FIG. 3, and therefore like actions may not be described again in detail with respect to the example method 300.

The example method 300 begins at 302, and historical sensor data yielded from one or more sensors operably coupled to the power system equipment is acquired at 304. The historical sensor data is indicative of sensor measurements acquired by sensor(s) over a first time interval. At 306 in the example method, historical field test data yielded from one or more field test performed on the power system equipment is acquired. The historical field test data is indicative of field test measurements related to the power system equipment and taken over a second time interval (e.g., which again may be the same time interval as the first time interval, may overlap the first time interval, and/or may be non-overlapping with the first time interval).

At 308 in the example method 300, at least one of the historical sensor data or the historical field test data are pre-processed. In one embodiment, such pre-processing may be utilized to identify and/or exclude anomalies in the data. By way of example, during the first time interval, one of a plurality of sensors comprised within the power system equipment may have malfunctioned. As a result, measurements from the sensor may deviate (outside a normal range) from measurements acquired by other sensors. Thus, at least a portion of the historical sensor data representing measurements by the malfunctioning sensor (e.g. and indicative of measurements that deviate outside the normal range) may be excluded from the historical sensor data (e.g., so as not to effect the analytical and/or iterative processes utilized to generate the health profile of the power system equipment), for example.

Pre-processing the data may also be utilized to weight a first portion of the historical sensor data more than a second portion of the historical sensor data and/or to weight a first portion of the historical field test data more than a second portion of the historical field test data. By way of example, some sensors within the power system equipment being assessed may have a higher degree of sensitivity when measuring one or more characteristics/properties of the power system equipment than other sensors within the power system equipment. For example, two sensors within a power transformer may be configured to measure the concentration of dissolved gases in the power transformer. However, a first sensor may be more sensitive to ethanol concentrations, for example, relative to a second sensor. As such, the pre-processing may weight historical sensor data indicative of ethanol measurements taken by the first sensor more than ethanol concentrations taken by the second sensor (e.g., because ethanol measurements taken by the first sensor may be more precise). In this way, data that more accurately/precisely reflects one or more characteristics of the historical sensor data and/or historical field test data may be weighted differently (e.g., higher) than other historical sensor data and/or other historical field test data that reflects the same one or more characteristics.

At 310 in the example method 300, historical sensor data and historical field test data (e.g., which was not excluded during the pre-processing) are merged to form a merged data set. That is, stated differently, the historical sensor data and the historical field test data are combined and/or synthesized to form a combined set of data representative of both sensor measurements and field test measurements. In one embodiment, such data may be correlated temporally. Thus, where the second time interval during which field test measurements are taken and the first time interval during which sensor measurements are taken at least partially overlap, data indicative of field test measurements may be intermingled with data indicative of sensor measurements, for example. Moreover, where some data is weighted more than other data, such weights may be reflected in the merged data.

It may be appreciated that in some embodiments, the information represented by the sensor measurements may overlap with information represented by the field test data. For example, at least some of the historical sensor data and at least some of the historical field test data may be indicative of dissolved gas concentrations in the oil, such as carbon monoxide concentrations, carbon dioxide concentrations, ethanol concentrations, etc. As a result, conflicts may occur between the historical sensor data and the historical field test data when the historical sensor data and historical field test data respectively reflect measurements acquired over an overlapping time interval, for example.

In one embodiment, as part of merging the historical sensor data with the historical field test data, conflicts are resolved between the various data sets. Such conflicts may be resolved according to one or more conflict resolution parameters. For example, in one embodiment, a conflict resolution parameter may be devised that gives preference to historical field test data (e.g., which generally is more accurate than sensor data) over historical sensor data. Thus, where there is conflict between historical field test data and historical sensor data, the conflict may be resolved in favor of the historical field test data (e.g., and the conflicting portion of the historical sensor data may be discarded). In another embodiment, the conflict resolution parameter may give preference to the data that reflects a measurement that best approximates temporally adjacent measurements of the same characteristic. In such an embodiment, the historical field test data may be given preference over the historical sensor data if the historical field test data represents a measurement of the characteristic that most closely resembles other temporally proximate measurements of the characteristic. Conversely, the historical sensor data may be given preference over the historical field test data if the historical sensor data represents a measurement of the characteristic that more closely resembles other temporally proximate measurements of the characteristic, for example. It may be appreciated that the foregoing conflict resolution parameters are merely example parameters and that other parameters for resolving conflicts between the historical sensor data and the historical field test data are also contemplated.

At 312 in the example method 300, the merged data set is used to generate a health profile of the power system equipment. The health profile may be indicative of a predicted health of the power system equipment. Such a prediction may be useful to estimate a maintenance timeline for the power system equipment and/or to estimate a replacement date for the power system equipment based upon trends and/or patterns in the merged data for the power system equipment. Moreover, in another embodiment, such a prediction may be useful to estimate a probability of maintenance over a specified time period and/or to estimate a probability of failure over the specified time period.

In one embodiment, the health of the power system equipment over a specified period of time can be predicted via analytical and/or interactive techniques that use, as inputs, the merged data. As an example, an algorithm, such as a machine learning and/or data analysis algorithm(s), may be developed based upon the merged data that is configured to perform clustering analysis, classification analysis, association analysis, pattern discovery, regression, anomaly detection analysis, and/or other predictive modeling which identifies trends and/or patterns in the merged data and extrapolates, from the data, information regarding the performance or health of the power system equipment over some period in the future, for example.

The example method 300 ends at 314.

Figure 4:
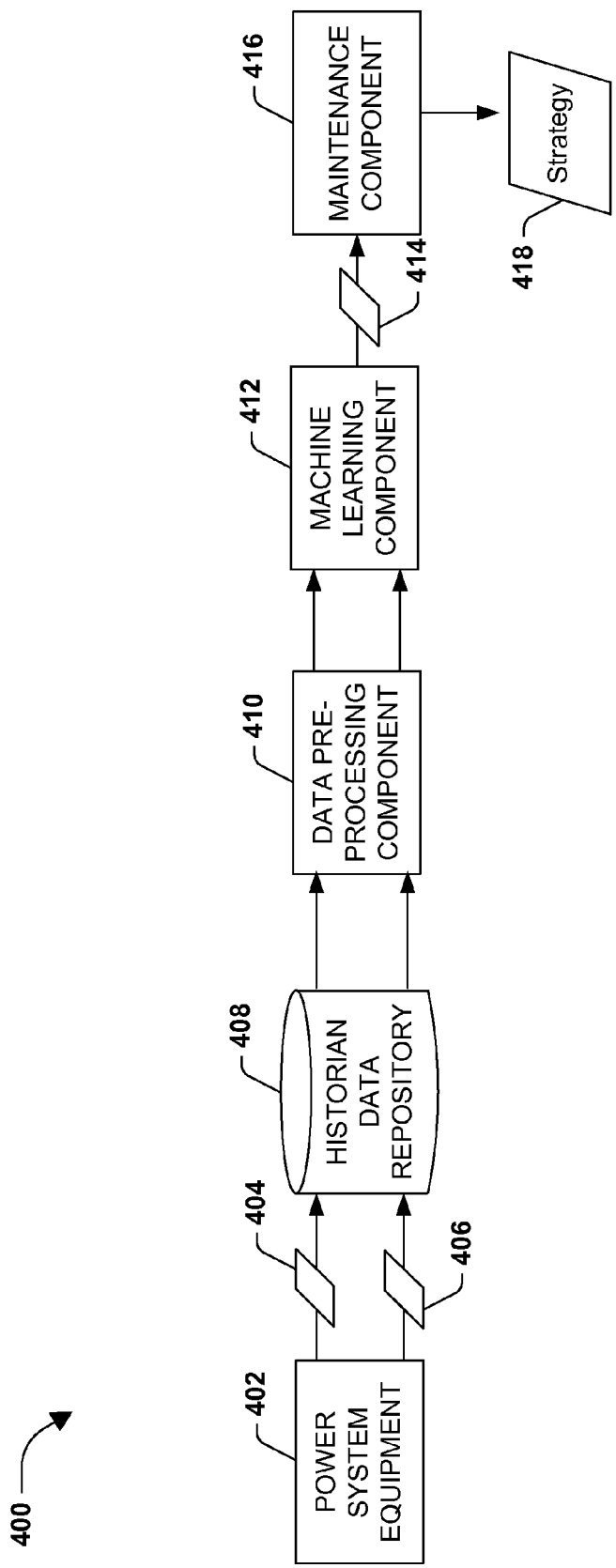
FIG. 4 illustrates a component block diagram of an example system for generating a health profile to assess power system equipment.
Figure 5:
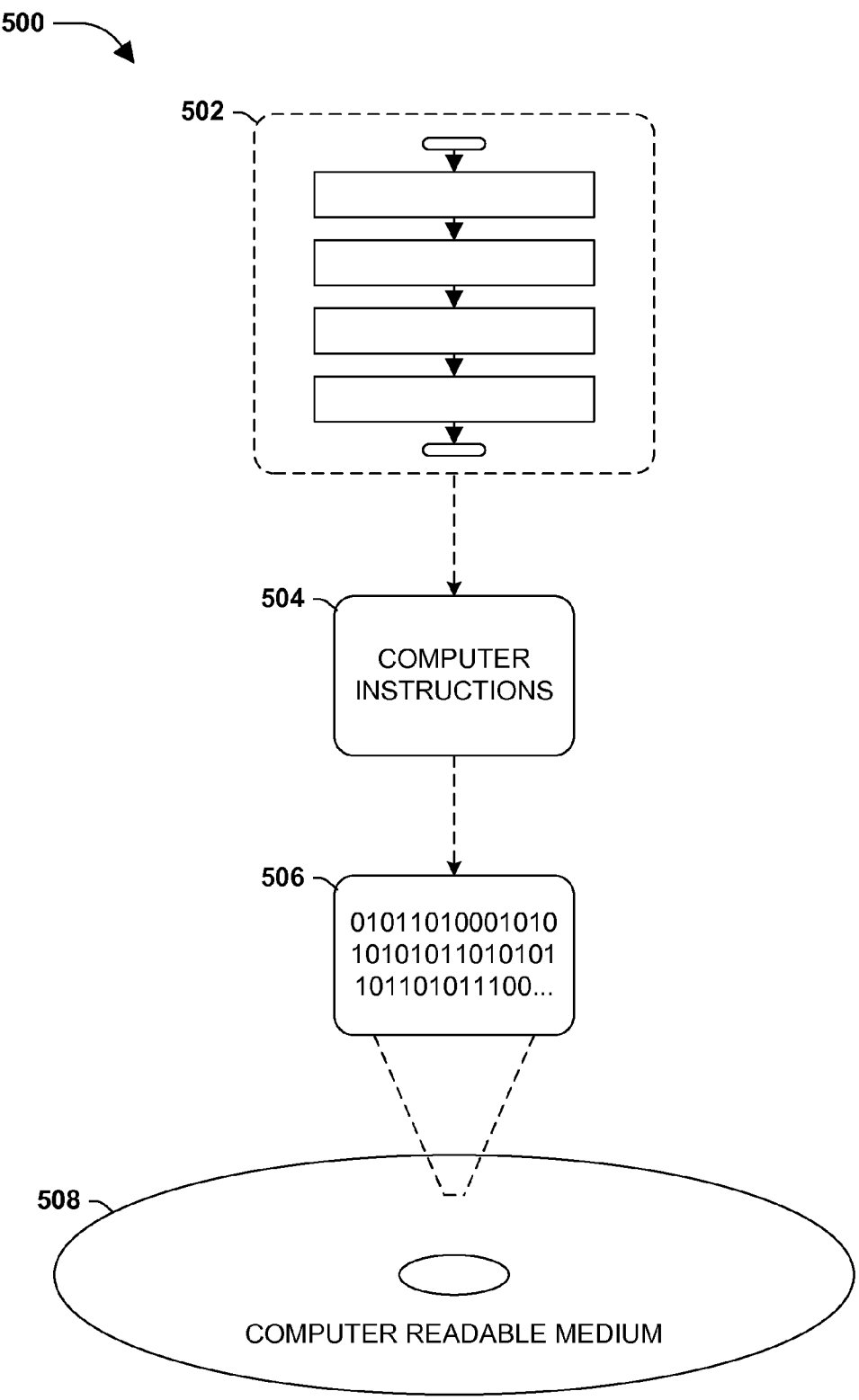
FIG. 5 is an illustration of an exemplary computer-readable medium wherein processor-executable instructions configured to embody one or more of the provisions set forth herein may be comprised.

FIG. 4 illustrates an example environment 400 of a system configured to predict a health of power system equipment 402, such as transformers, circuit breakers, capacitors, or other electric components of a power system.

In the example environment 400, sensor data 404 and/or field test data 406 may be collected from the power system equipment 402 over time. It may be appreciated that the sensor data 404 and the field test data 406 may be collected over a same interval of time or over different intervals of times (e.g., which may be overlapping or non-overlapping).

In the illustrated embodiment, the sensor data 404 and the field test data 406 are stored in a historian data repository 408 (e.g., such as a central repository configured to store data acquired over a period of time and/or any other type of storage mechanism that may store historical data, real-time data, predicted data, and/or any other type of data, etc.). In this way the historian data repository 408 receives, over time, sensor data 404 to develop historical sensor data describing how sensor measurements, acquired from one or more sensors operably coupled to the power system equipment, change with time. Likewise the historian data repository 408 receives, over time, field test data 406 to develop historical field test data describing how field test measurements, acquired from various field test, change with time. It may be appreciated that the historian data repository 408 may comprise one or more storage devices, and thus the sensor data 404 may not necessarily be stored in a same physical location as the field test data 406. Moreover, at least some of the sensor data 404 may be stored at a different location (e.g., a different storage device) than other sensor data 404 and/or at least some of the field test data 406 may be stored at a different location than other field test data 406.

The example environment 400 further comprises a data pre-processing component 410 configured to at least one of merge the historical sensor data with the historical field test data to form a merged data set or identify anomalies in at least one of the historical sensor data and/or historical field test data. In one embodiment, anomalies (e.g., results of measurements that deviate, by more than a specified threshold, from results of other measurements of a same/similar characteristic) identified in a data set may be excluded from the data set. Further, where the historical sensor data and historical field test data are merged to form the merged data set, such anomalies may be excluded from the merged data set, for example. The output of the data pre-processing component 410 may be clean (e.g., updated) historical sensor data, clean historical field test data, and/or a merged data set (e.g., with little to no data anomalies), for example. Such output may be transmitted to a machine learning component 412 and/or may be transmitted to the historian data repository 408, for example, where it may be stored until requested by the machine learning component 412, for example.

The machine learning component 412 is configured to generate a health profile 414 of the power system equipment using the historical sensor data and the historical field test data (e.g., which may be in its original form, clean form, and/or in the merged data set). As previously described, the health profile is indicative of a predicted health of the power system equipment and may describe, among other things, a probability or risk of failure, for example. In one embodiment, such a health profile 414 may comprise a health index score of the power system equipment 402 which may be descriptive of how urgently the power system equipment 402 requires maintenance and/or replacement when the risk of failure is evaluated in view of the importance of the power system equipment 402 to the power system.

In one embodiment, the machine learning component 412 may also be configured to compare the health profile 414 to at least one of new sensor data (e.g., more recently acquired sensor data) and/or new field test data (e.g., more recently acquired field test data) to determine if a current state of the power system equipment 402 deviates from the profile by more than a specified threshold. Where at least one of the new sensor data and/or the new field test data is indicative of a substantial deviation(s) relative to the health profile 414, the deviation(s) may indicate that a health of the power system equipment 402 is declining/degrading faster than expected (when the health profile 414 was created). Thus, the power system equipment 402 may require maintenance more urgently than previously expected and a request or notice may be generated indicative of such a finding, for example.

The example environment 400 also comprises a maintenance component 416 configured to develop a maintenance strategy 418 for the power system or a portion of the power system based upon the health profile 414 of the power system equipment 402 and other health profiles for other power system equipment respectively generated by the machine learning component 412, for example. For example, at previously described with respect to the method 300 illustrated in FIG. 3, the maintenance component 416 may be configured to rank or order power system equipment according to their respective health index score provided in the respective health profiles. Power system equipment requiring maintenance more urgently (e.g., when consideration is given to the importance of the power system equipment and risk of failure) may have a lower health index score and may be ranked/ordered higher in the maintenance strategy 418, for example. In this way, a strategy may be developed for allocating maintenance resource to components of the grid in a manner that takes into consideration the value/importance of the power system equipment and the risk of failure, for example.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein. In one such embodiment 500, the processor-executable computer instructions 504 may be configured to perform a method 502 such as at least some of the exemplary method 100 of FIG. 1 and/or at least some of the exemplary method 300 of FIG. 3, for example. In another such embodiment, the processor-executable instructions 504 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
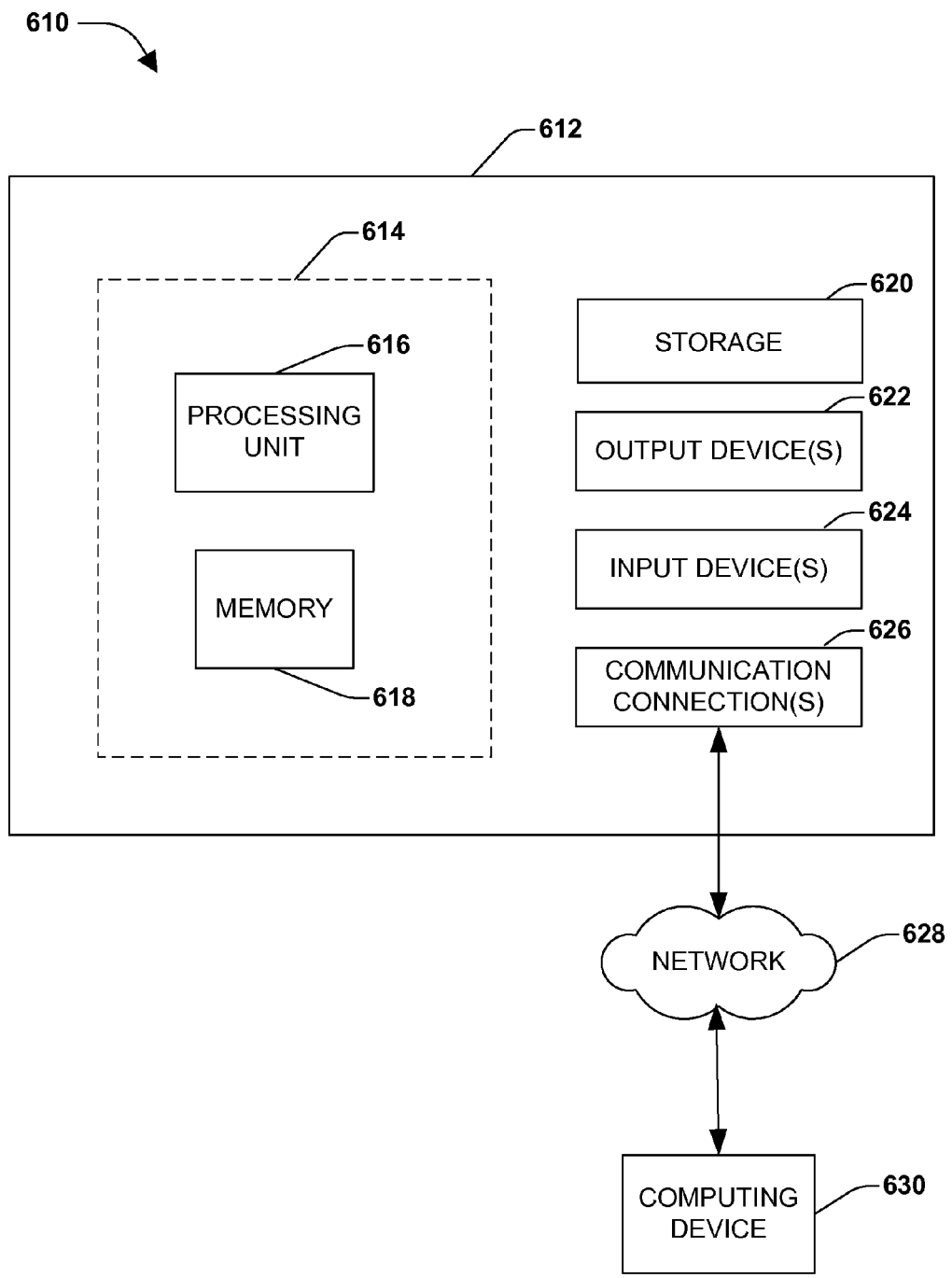
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example) or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for assessing power system equipment to predict a health of the power system equipment, comprising:
    acquiring historical sensor data yielded from one or more sensors operably coupled to the power system equipment, the historical sensor data indicative of one or more sensor measurements;
    acquiring historical field test data yielded from one or more field tests performed on the power system equipment, the historical field test data indicative of one or more field test measurements;
    merging the historical sensor data for the power system equipment and the historical field test data for the power system equipment to form a merged data set, the merging comprising:
        resolving a conflict between the historical sensor data for the power system equipment and the historical field test data for the power system equipment based upon a conflict resolution parameter that gives preference to first data for the power system equipment representing a measurement of a characteristic that more closely resembles temporally proximate measurements of that characteristic than second data for the power system equipment;
    using the merged data set to generate a health profile of the power system equipment, the health profile indicative of a predicted health of the power system equipment; and
    replacing at least part of the power system equipment based upon the predicted health indicating a likelihood of failure of the power system equipment.

2. The method of claim 1, the power system equipment comprising a power transformer.

3. The method of claim 1, comprising:
    evaluating the historical sensor data and the historical field test data to identify an anomaly corresponding a first measurement that deviates from a set of measurements beyond a specified threshold; and
    excluding the anomaly from the merged data set.

4. The method of claim 1, the merging comprising:
    resolving a second conflict between the historical sensor data and the historical field test data in favor of the historical field test data.

5. The method of claim 1, the merging comprising:
    temporally correlating the historical sensor data with the historical field test data.

6. The method of claim 1, the merging comprising:
    identifying historical sensor data to exclude from the merged data set prior to the merging.

7. The method of claim 1, comprising:
    comparing the health profile to new sensor data and new field test data to determine if a current state of the power system equipment deviates from the health profile by more than a specified threshold.

8. The method of claim 7, comprising:
    responsive to determining that the current state of the power system equipment deviates from the health profile by more than the specified threshold, issuing a maintenance request to perform maintenance associated with the power system equipment.

9. The method of claim 1, wherein the health profile comprises a health index score for the power system equipment, the health index score derived based upon an importance of the power system equipment in a power system and a risk of failure of the power system equipment.

10. The method of claim 9, comprising:
    developing a maintenance strategy for maintaining the power system, wherein the maintenance strategy ranks the power system equipment relative to second power system equipment according to the health index score of the power system equipment and a second health index score of the second power system equipment.

11. The method of claim 1, the using the merged data set comprising:
  developing an algorithm for generating the profile based upon the historical sensor data and the historical field test data.

12. The method of claim 1, the using the merged data set comprising:
  analyzing the historical sensor data and the historical field test data using:
    clustering analysis;
    classification analysis;
    association analysis;
    prediction analysis; and
    anomaly detection analysis.

13. A system for predicting a health of power system equipment, comprising:
  a historian data repository configured to receive, over time, sensor data yielded from one or more sensors operably coupled to the power system equipment to create historical sensor data and configured to receive, over time, field test data yielded from one or more field tests performed on the power system equipment to create historical field test data;
  a machine learning component configured to:
    generate a health profile of the power system equipment using the historical sensor data and the historical field test data, the health profile indicative of a predicted health of the power system equipment;
    determine an importance of the power system equipment in a power system based upon at least one of a number of consumers that are supplied electricity from the power system equipment or a level of redundancy of the power system equipment in the power system; and
    assign a health index score to the power system equipment based upon the importance of the power system equipment in the power system in relation to a risk of failure of the power system equipment; and
  a maintenance component configured to replace at least part of the power system equipment based upon the health index score.

14. The system of claim 13, the machine learning component configured to:
  compare the health profile to new sensor data and new field test data to determine if a current state of the power system equipment deviates from the health profile by more than a specified threshold.

15. The system of claim 13, the machine learning component configured to determine the importance of the power system equipment based upon the number of consumers that are supplied electricity from the power system equipment.

16. The system of claim 13, the maintenance component configured to develop a maintenance strategy for maintaining the power system, wherein the maintenance strategy ranks the power system equipment relative to second power system equipment according to the health index score of the power system equipment and a second health index score of the second power system equipment.

17. The system of claim 13, comprising a data pre-processing component configured to form a merged data set by temporally correlating the historical sensor data and the historical field test data.

18. The system of claim 17, the data pre-processing component configured to identify an anomaly and to exclude the anomaly from the merged data set.

19. The system of claim 13, the machine learning component configured to determine the importance of the power system equipment based upon the level of redundancy of the power system equipment in the power system.

20. A non-transitory computer readable medium comprising processor executable instructions that when executed perform a method for assessing power system equipment to predict a health of the power system equipment, the method comprising:
  acquiring historical sensor data yielded from one or more sensors operably coupled to the power system equipment, the historical sensor data indicative of one or more sensor measurements;
  acquiring historical field test data yielded from one or more field tests performed on the power system equipment, the historical field test data indicative of one or more field test measurements;
  merging the historical sensor data for the power system equipment and the historical field test data for the power system equipment to form a merged data set, the merging comprising:
    resolving a conflict between the historical sensor data for the power system equipment and the historical field test data for the power system equipment based upon a conflict resolution parameter that gives preference to first data for the power system equipment representing a measurement of a characteristic that more closely resembles temporally proximate measurements of that characteristic than second data for the power system equipment;
  determining an importance of the power system equipment in a power system based upon at least one of a number of consumers that are supplied electricity from the power system equipment or a level of redundancy of the power system equipment in the power system;
  assigning a health index score to the power system equipment based upon the importance of the power system equipment in the power system in relation to a risk of failure of the power system equipment;
  using the merged data set and the health index score to generate a health profile of the power system equipment, the health profile indicative of a predicted health of the power system equipment; and
  replacing at least part of the power system equipment based upon the predicted health indicating a likelihood of failure of the power system equipment.

* * * * *